(12) United States Patent
Coursolle

(10) Patent No.: US 7,073,393 B2
(45) Date of Patent: Jul. 11, 2006

(54) MAGNETIC FLOWMETER WITH BUILT-IN SIMULATOR

(75) Inventor: Thomas P. Coursolle, deceased, late of St. Paul, MN (US); by Annette M. Webb, legal representative, St. Paul, MN (US)

(73) Assignee: Rosemount Inc., Eden Prairie, MN (US)

( * ) Notice: Subject to any disclaimer, the term of this patent is extended or adjusted under 35 U.S.C. 154(b) by 47 days.

(21) Appl. No.: 10/978,685

(22) Filed: Nov. 1, 2004

(65) Prior Publication Data
US 2006/0095217 A1    May 4, 2006

(51) Int. Cl.
*G01F 1/58* (2006.01)
(52) U.S. Cl. .................................................. 73/861.12
(58) Field of Classification Search .............. 73/861.12
See application file for complete search history.

(56) References Cited

U.S. PATENT DOCUMENTS

| | | | | |
|---|---|---|---|---|
| 3,449,951 A * | 6/1969 | Westersten | ............... | 73/861.17 |
| 4,262,542 A | 4/1981 | Freund, Jr. et al. | ...... | 73/861.12 |
| 4,262,543 A | 4/1981 | Grebe, Jr. et al. | ........ | 73/861.17 |
| 4,283,958 A | 8/1981 | Freund, Jr. et al. | ...... | 73/861.12 |
| 4,287,773 A | 9/1981 | Freund, Jr. et al. | ...... | 73/861.12 |
| 4,287,774 A | 9/1981 | Grebe, Jr. et al. | ........ | 73/861.17 |
| 4,306,461 A | 12/1981 | Grebe, Jr. | ................. | 73/861.12 |
| 4,309,909 A | 1/1982 | Grebe, Jr. et al. | ........ | 73/861.12 |
| 4,325,261 A | 4/1982 | Freund, Jr. et al. | ...... | 73/861.12 |
| 4,459,857 A | 7/1984 | Murray et al. | ........... | 73/861.12 |
| 4,676,112 A | 6/1987 | Uematsu et al. | .......... | 73/861.17 |
| 5,090,250 A | 2/1992 | Wada | ....................... | 73/861.12 |
| 5,398,552 A | 3/1995 | Marsh | ...................... | 73/861.12 |
| 5,402,685 A | 4/1995 | Brobeil | ..................... | 73/861.12 |
| 5,426,984 A | 6/1995 | Rovner et al. | ........... | 73/861.17 |
| 5,487,310 A * | 1/1996 | Higuchi | .................... | 73/861.17 |
| 6,031,740 A | 2/2000 | Budmiger | ..................... | 363/58 |
| 6,076,391 A | 6/2000 | Broch | ......................... | 73/1.15 |
| 6,598,487 B1 | 7/2003 | Marsh | ...................... | 73/861.12 |
| 6,634,238 B1 | 10/2003 | Budmiger | ................ | 73/861.17 |
| 6,708,569 B1 | 3/2004 | Budmiger | ................ | 73/861.12 |

FOREIGN PATENT DOCUMENTS

DE          33 03 017 C1     1/1983
EP           1 584 902 A1    10/2005

OTHER PUBLICATIONS

Notification of Transmittal of the International Search Report and the Written Opinion of the International Searching Authority, or the Declaration for International Application No. PCT/US2005/038737, filed Oct. 27, 2005. Date of Mailing: Mar. 28, 2006.

* cited by examiner

*Primary Examiner*—Harshad Patel

(57) ABSTRACT

A magnetic flowmeter transmitter includes a differential amplifier that senses an additive combination of actual flowmeter electrode outputs and simulated electrode outputs. The differential amplifier provides an additive amplifier output. A simulator provides the simulated electrode outputs. The simulator senses the additive amplifier output and provides an error indication when the additive amplifier output is outside a normal range.

23 Claims, 7 Drawing Sheets

MAGNETIC FLOWMETER WITH BUILT-IN SIMULATOR

FIELD OF THE INVENTION

The present invention relates to diagnostics of magnetic flowmeters.

BACKGROUND OF THE INVENTION

Magnetic flowmeters are used for liquid flow measurements in fluid processing installations such as chemical plants, food processing plants and pulp and paper plants. The magnetic flowmeter includes a flowtube assembly that is mounted in a piping system. The magnetic flowmeter also includes a transmitter that is connected to the flowtube assembly by a cable, or the transmitter can be integrally mounted to the flowtube assembly.

Magnetic flowmeters are subject to failure due to extremes of temperature, vibration, chemical corrosion and the like. When a failure occurs, there is a need to rapidly diagnose the failure and replace a damaged part of the system. Ascertaining which portion of a magnetic flowmeter has failed can be difficult, particularly when the flowtube assembly is mounted in an inaccessible location. There is a desire to automate failure diagnosis so that service personnel can rapidly determine whether a transmitter needs replacement or whether the flowtube assembly and cabling need replacement.

SUMMARY OF THE INVENTION

Disclosed is a magnetic flowmeter transmitter. The magnetic flowmeter transmitter includes a differential amplifier that senses an additive combination of actual flowmeter electrode outputs and simulated electrode outputs. The differential amplifier provides an additive amplifier output. A simulator provides the simulated electrode outputs. The simulator senses the additive amplifier output and provides an error indication when the additive amplifier output is outside a normal range.

DETAILED DESCRIPTION OF THE ILLUSTRATED EMBODIMENTS

In the embodiments described below, a magnetic flowmeter is provided with a simulator that is built into a magnetic flowmeter transmitter. The simulator provides simulated electrode outputs for testing the active electronics in the magnetic flowmeter transmitter and for providing an error indication if the active electronics are malfunctioning. This error indication enables service personnel to quickly ascertain whether a flowmeter malfunction is due to a transmitter problem or a flowtube and cabling problem. The simulator can operate automatically, or can be activated by a command keyed in by service personnel.

Figure 1:
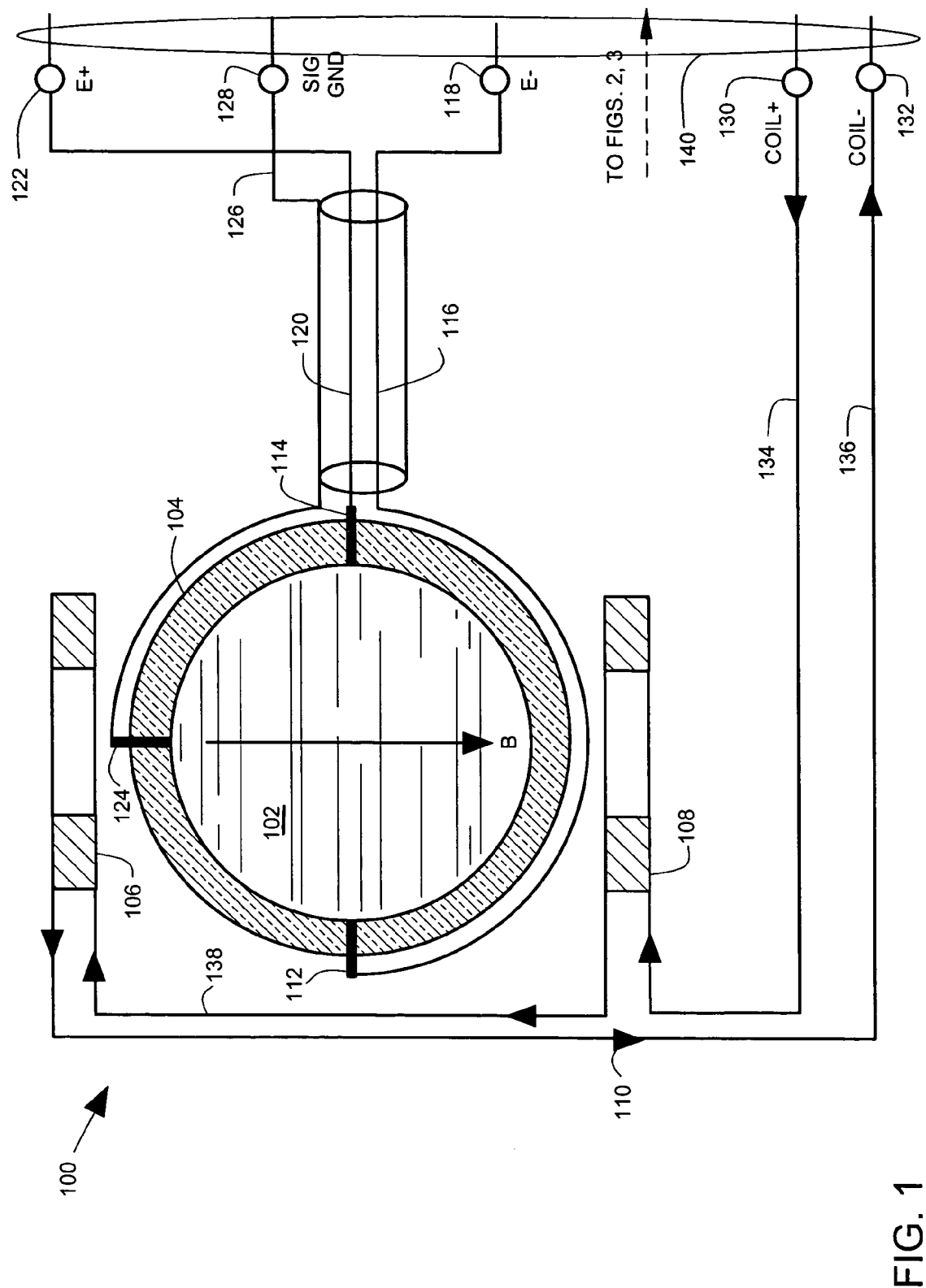
FIG. 1 illustrates a magnetic flowmeter flowtube assembly.

FIG. 1 illustrates a magnetic flowmeter flowtube assembly 100. The flowtube assembly 100 carries a flow of a liquid 102 through a conduit 104. Magnet coils 106, 108 carry an electric current 110 that produces a magnetic field B in the liquid 102. As the liquid 102 flows through the magnetic field B, a potential difference is generated in the liquid 102 according to Faraday's law of magnetic induction. The potential difference is sensed by flowtube electrodes 112, 114 and is directly proportional to a flow velocity of the liquid 102 through the conduit 104.

The flowtube electrode 112 is connected by a lead 116 to an minus electrode terminal 118. The flowtube electrode 114 is connected by a lead 120 to a plus electrode terminal 122. A ground electrode 124 provides a process fluid ground connection. The ground electrode 124 is connected by a lead 126 (which can include a cable shield as illustrated) to a signal ground terminal 128. The ground electrode 124 can be a metal pin in the conduit 104, or can alternatively be ground rings or metal piping in contact with the liquid 102. Coil terminals 130, 132 are connected by leads 134, 136, 138 to the magnet coils 106, 108 to supply the electric current 110. The electric current 110 is typically a ramped square wave with an amplitude typically about 0.5 to 0.075 ampere and fundamental frequency typically about 3 to 75 Hertz.

The terminals 118, 122, 128, 130, 132 on the flowtube assembly 100 are connectable by a cable assembly 140 to a magnetic flowmeter transmitter such as one of the magnetic flowmeter transmitters described below in connection with FIGS. 2A, 2B, 3. The cable assembly typically includes an electrostatically shielded cable for electrode leads and a twisted pair or shielded cable for coil leads. The flowtube assembly 100 is typically mounted in a process piping system, and connects via the cable assembly 140 to the magnetic flowmeter transmitter. The magnetic flowmeter transmitter may be mounted on the flowtube assembly 100, or the transmitter may be mounted in a remote location and connected via a long cable assembly 140. Flowtube 100 and the connecting cable are frequently subject to environmental extremes of vibration, temperature extremes, hostile chemical atmospheres, corrosive fluids, impacts and the like and are subject to damage. When damage does occur, the flowtube assembly 100 may be located in a piping system of a process plant where it is difficult and time consuming to access for electrical troubleshooting by service personnel.

Figure 2A:
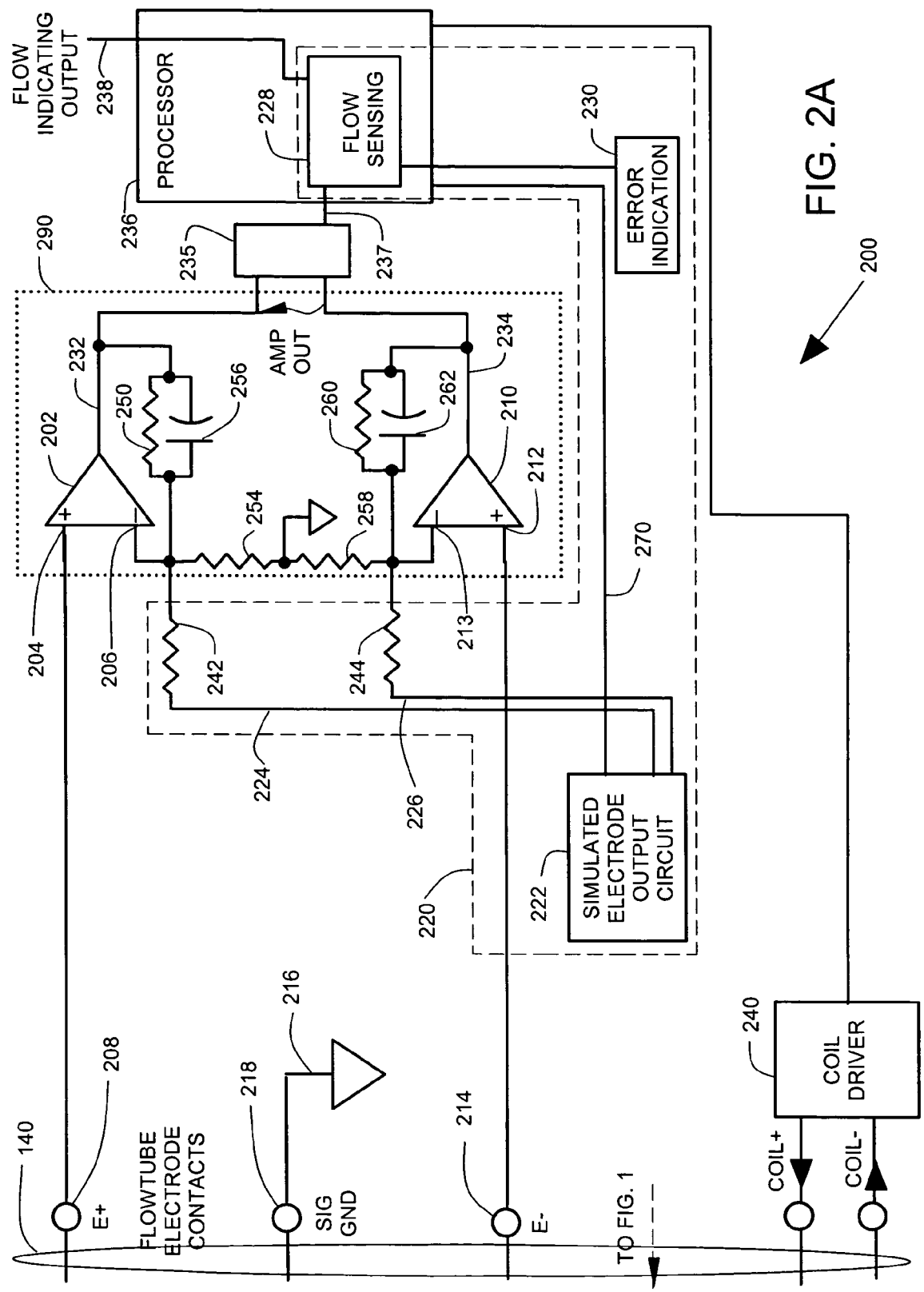
FIG. 2A illustrates a first magnetic flowmeter transmitter.

FIG. 2A illustrates one embodiment of a magnetic flowmeter transmitter 200. FIG. 2A is best understood when joined together with FIG. 1 at cable assembly 140 to form a single diagram of a complete magnetic flowmeter.

The transmitter 200 comprises a first amplifier 202 that has a first input 204 and a second input 206. The first input 204 couples to a first flowtube electrode contact 208. The first flowtube electrode contact 208 connects via the cable assembly 140 to the electrode terminal 122 in FIG. 1. The transmitter 200 also comprises a second amplifier 210 that has a third input 212 and a fourth input 213. The third input 212 couples to a second flowtube electrode contact 214. The second flowtube electrode contact 214 couples via the cable assembly 140 to the electrode terminal 118 in FIG. 1. A transmitter signal ground 216 is connected to a signal ground contact 218. The signal ground contact 218 connects via the cable assembly 140 to the signal ground terminal 128 in FIG. 1. The amplifiers 202, 210 have amplifier outputs 232, 234 that couple to an analog-to-digital converter (ADC) 235. The ADC 235 provides a digital output 237 to a processor 236. The processor 236 preferably comprises a digital signal processor. The processor 236 calculates and provides a flow indicating output 238 as a function of a sampled difference between the amplifier outputs 232, 234.

Amplifiers 202, 210 and biasing circuits associated with amplifiers 202, 210, taken together, comprise a differential amplifier 290. The differential amplifier 290 senses an additive combination of an actual flow voltage and a simulated flow voltage. The differential amplifier 290 provides an additive amplifier output (on lines 232, 234) that includes components of both the actual flow voltage and the simulated flow voltage.

The transmitter 200 includes a simulator 220. In one embodiment, the simulator 220 includes a simulated output circuit 222 that provides simulated electrode outputs 224, 226 to the second input 206 and the fourth input 213. The simulated electrode outputs 224, 226 couple via resistors 242, 244 to the inputs 206, 213. The amplifier 202 has a feedback and biasing network comprising resistors 250, 254 and capacitor 256. The amplifier 210 has a feedback and biasing network comprising resistors 258, 260 and capacitor 262. The resistors 242, 244 and the feedback and biasing networks form resistive voltage dividers that reduce the high level (on the order of 3 volts) simulated electrode outputs 224, 226 to low level signal components (on the order of 2 millivolts) at the inputs 206, 213. The amplifier outputs 232, 234 couple to an analog-to-digital converter (ADC) 235. The ADC generates a digital output 237 that is representative of actual and simulated flow voltages sensed by the amplifiers 202, 210.

The simulator 220 includes a flow sensing circuit 228 that receives the ADC digital output 237. During normal operation intervals, the flow sensing circuit 228 senses only an actual flow voltage from the flowtube. During diagnostic test intervals, the flow sensing circuit senses both the actual flow voltage and the simulated flow voltage. During normal operation intervals, the flow indicating output 238 is updated by actual flow data. During diagnostic test intervals, the error indication 230 is updated based on an evaluation of the combined actual flow and simulated flow voltages. An error is indicated when the sensed response is outside a normal range of response for a correctly functioning transmitter 200. The flow sensing circuit 228 is preferably realized as part of the embedded processor 236 as illustrated. The embedded processor 236 controls operation of a coil driver circuit 240 and the simulated output circuit 222. The coil driver circuit 240 generates a regulated coil drive current (110 in FIG. 1) that couples via the cable assembly 140 to terminals 130, 132 in FIG. 1.

On either an automatic time schedule set by the processor 236, or as a result of a request keyed in by service personnel, the processor provides an output on line 270 to the simulated output circuit 222 that causes the simulated output circuit 222 to temporarily generate a simulated flow output on lines 224, 226. This is referred to as a diagnostic test interval. During this simulated flow condition, the processor 236 does not update the flow indicating output 238, but instead updates the error indication 230. It will be understood by those skilled in the art that the generation of the simulated flow output can be controlled by software, firmware, hardware, or a combination of hardware, firmware or software. If the amplifier outputs 232, 234 are outside of a normal range for such a test simulation, then the flow sensing circuit provides an error indication 230 that indicates that the transmitter electronics have malfunctioned. This error indication 230 informs service personnel that the transmitter needs to be replaced. If the flowmeter system is malfunctioning but there is no error indication 230, then service personnel are informed that the transmitter is likely working properly and their electrical troubleshooting efforts can properly be directed to cable assembly 140 and flowtube assembly 100.

Additional embodiments of the transmitter 200 are described in more detail below by way of further examples described in connection with FIGS. 2B, 3.

Figure 2B:
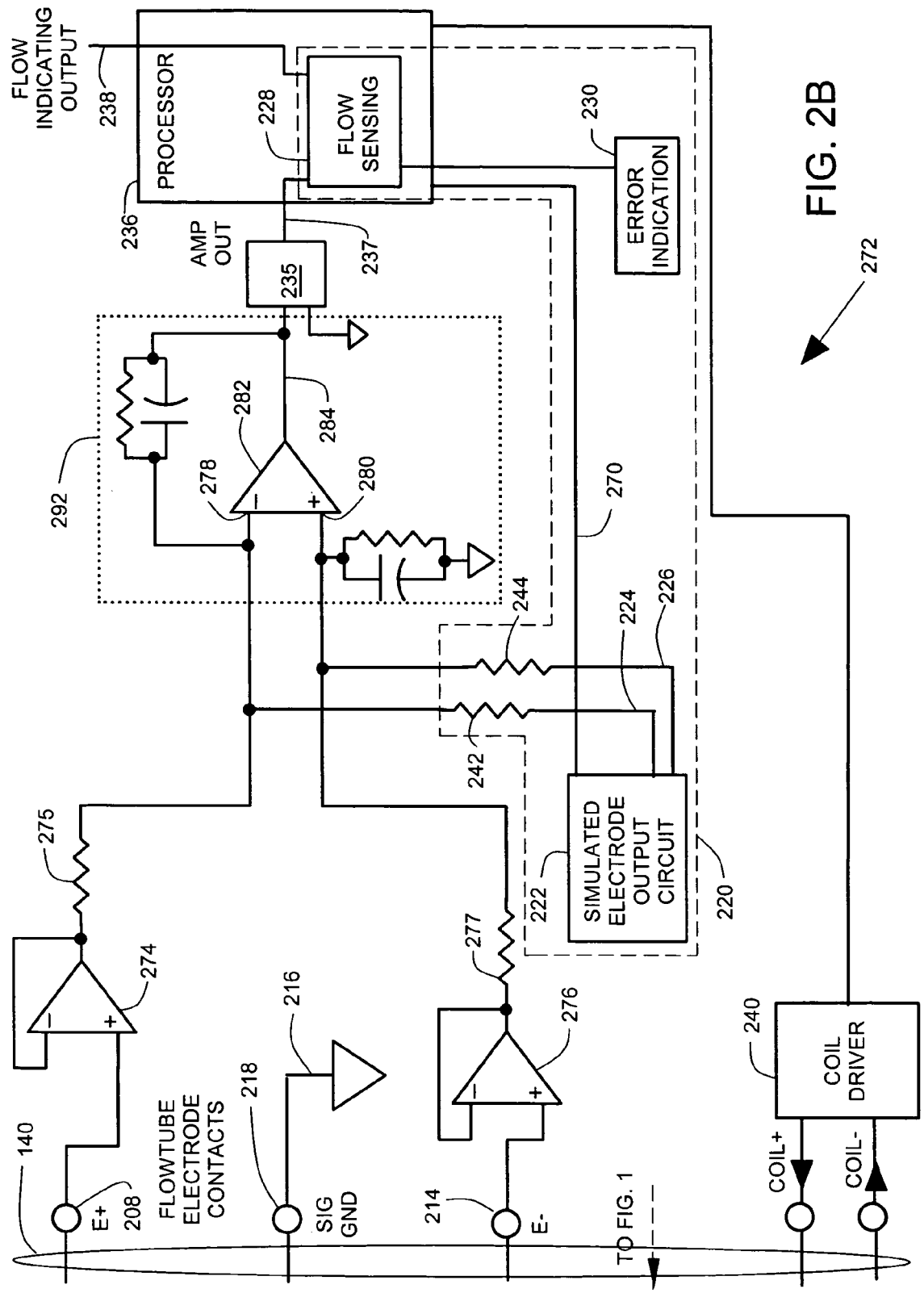
FIG. 2B illustrates a second magnetic flowmeter transmitter.

FIG. 2B illustrates another embodiment of a magnetic flowmeter transmitter 272. FIG. 2B is best understood when joined together with FIG. 1 at cable assembly 140 to form a single diagram of a complete magnetic flowmeter. Reference numbers used in FIG. 2B that are the same as reference numbers used in FIG. 2A describe the same or similar features.

In FIG. 2B, flowtube electrode contacts 208, 214 connect to high impedance inputs of unity gain buffers 274, 276. Outputs of the unity gain buffers 274, 276 couple through resistors 275, 277 to inputs 278, 280 of a differential amplifier 282. An amplifier output 284 of the differential amplifier 282 couples to analog-to-digital converter (ADC) 235. An ADC output 237 couples to the embedded processor 236. Simulated output circuit 222 provides simulated electrode outputs 224, 226 which couple through resistors 242, 244 to the amplifier inputs 278, 280.

Amplifier 282 and biasing circuits associated with amplifier 282, taken together, comprise a differential amplifier 292. The differential amplifier 292 senses an additive combination of an actual flow voltage and a simulated flow voltage. The differential amplifier 292 provides an additive amplifier output (on line 284) that includes components of both the actual flow voltage and the simulated flow voltage.

The arrangement shown in FIG. 2B provides a simple differential amplifier circuit arrangement in which actual electrode outputs and simulated electrode outputs are both coupled to the same pair of differential amplifier inputs 278, 280. In other respects, the magnetic flow transmitter 272 shown in FIG. 2B is similar to the magnetic flow transmitter shown in FIG. 2A.

Figure 3:
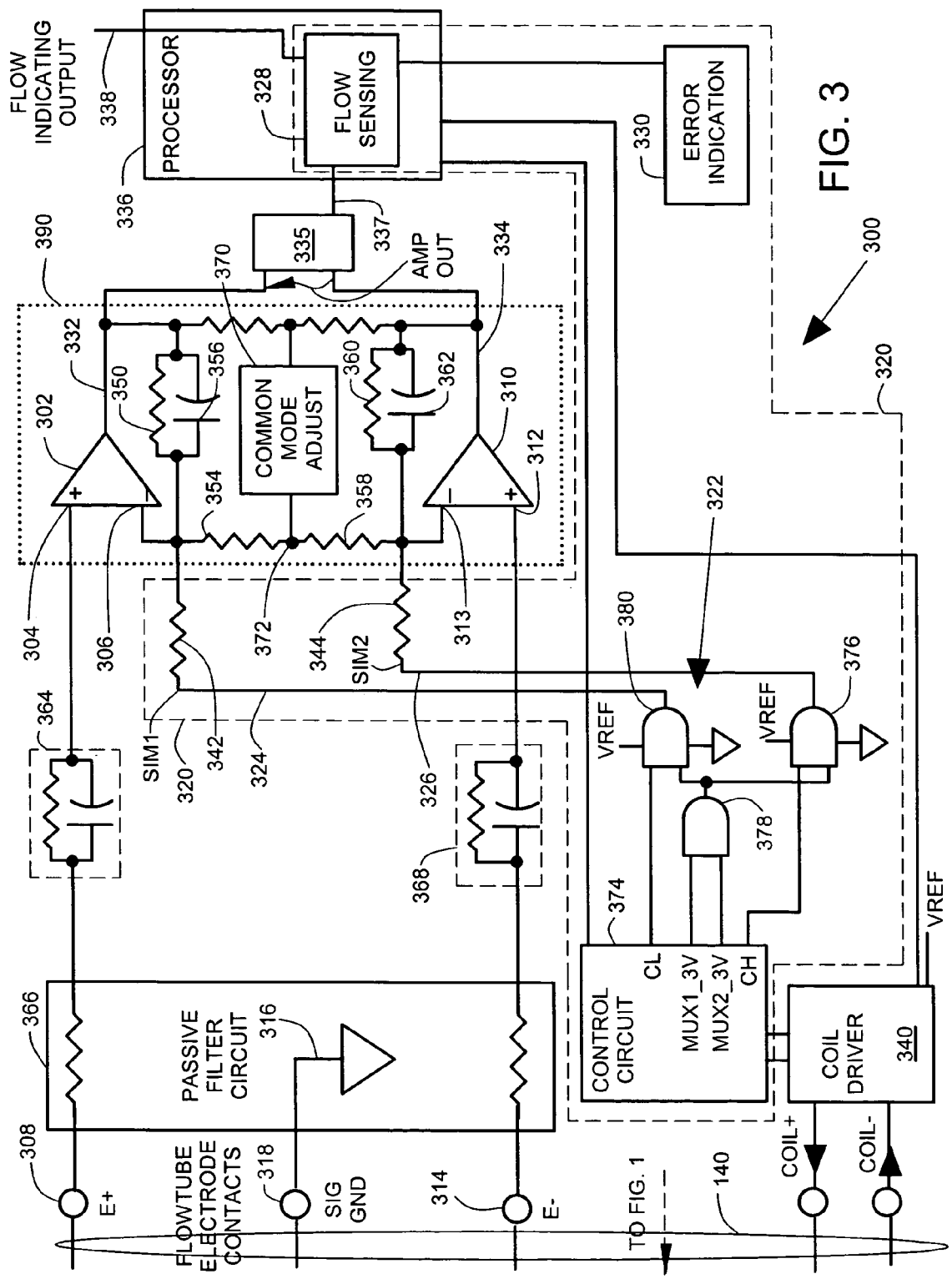
FIG. 3 illustrates a third magnetic flowmeter transmitter.

According to another embodiment, FIG. 3 illustrates a magnetic flowmeter transmitter 300. FIG. 3 is best understood when joined together with FIG. 1 to form a single diagram of a complete magnetic flowmeter.

The transmitter 300 comprises a first amplifier 302 that has a first input 304 and a second input 306. The first input 304 couples through a filter (RC circuit) 364 and a passive filter circuit 366 to a first flowtube electrode contact 308. The first flowtube electrode contact 308 connects via the cable assembly 140 to the electrode terminal 122 in FIG. 1.

The transmitter 300 also comprises a second amplifier 310 that has a third input 312 and a fourth input 313. The third input 312 couples through a filter (RC circuit) 368 and the passive filter circuit 366 to a second flowtube electrode contact 314. The second flowtube electrode contact 314 couples via the cable assembly 140 to the electrode terminal 118 in FIG. 1. A transmitter signal ground 316 is connected to a signal ground contact 318 and to the passive filter circuit 366. The signal ground contact 318 connects via the cable assembly 140 to the signal ground terminal 128 in FIG. 1. The amplifiers 302, 310 have amplifier outputs 332, 334 that couple to an analog-to-digital converter (ADC) 335. The ADC 335 provides a digital output 337 to an embedded processor 336 that calculates and provides a flow indicating output 338 as a function of the amplifier outputs 332, 334. The embedded processor 336 preferably comprises digital signal processing circuits (DSP).

The transmitter 300 includes a simulator 320. The simulator 320 adds or superimposes a simulation signal on the flow signal for diagnostic purposes. The simulator 320 includes a simulated output circuit 322 that provides simulated electrode outputs (SIM1) 324, (SIM2) 326 to the second input 306 and the fourth input 313. The simulated electrode outputs 324, 326 couple via resistors 342, 344 to the inputs 306, 313. The amplifier 302 has a feedback and biasing network comprising resistors 350, 354 and capacitor 356. The amplifier 310 has a feedback and biasing network comprising resistors 358, 360 and capacitor 362. The resistors 342, 344 and the feedback and biasing networks form resistive voltage dividers that reduce the high level simulated electrode outputs 324, 326 to low level signal components (on the order of a millivolt) at the inputs 306, 313. A common mode adjustment circuit 370 senses an average value of the amplifier outputs 332, 334 and provides a common mode voltage adjustment signal to node 372.

Amplifiers 302, 312 and biasing circuits associated with amplifiers 302, 312, taken together, comprise a differential amplifier 390. The differential amplifier 390 senses an additive combination of an actual flow voltage and a simulated flow voltage. The differential amplifier 390 provides an additive amplifier output (on lines 332, 334) that includes components of both the actual flow voltage and the simulated flow voltage.

The simulator 320 includes a flow sensing circuit 328 that senses a response to the simulated electrode outputs 324, 326 and provides an error indication 330 when the sensed response is outside a normal range of response for a correctly functioning transmitter 300. The flow sensing circuit 328 is used both for sensing flow to provide a flow indicating output 338 and also for sensing a superimposed or additive combination of flow and the simulation output to provide the error indication 330. The flow sensing circuit 328 is controlled by the processor to provide the appropriate output (either flow indicating output 338 or error indication 330), depending on whether a simulated output is applied. The flow sensing circuit 328 is preferably realized as part of the embedded processor 336 as illustrated. The embedded processor 336 controls operation of a coil driver circuit 340 and the simulated output circuit 322. The coil driver circuit 340 generates a regulated coil drive current (110 in FIG. 1) that couples via the cable assembly 140 to terminals 130, 132 in FIG. 1.

The passive filter circuit 366 and the filtering circuits 364, 368 comprise passive components such as resistors, capacitors and inductors and do not comprise active components such as diodes, transistors and integrated circuits. The use of passive components provides for a very low probability of component failure in comparison with probability of component failure in active components. The simulated electrode outputs 324, 326 do not couple through the passive filter circuit 366 or the filtering circuits 364, but the simulated electrode outputs do couple through, and test, the active components such as amplifiers 302, 310, ADC 335 and processor 336. The actual electrode signals couple into inputs 304, 312 while the simulated electrode signals couple into inputs 306, 313 that are separate from inputs 304, 312. This arrangement prevents the simulated electrode signals from loading the actual electrode signals during normal operation.

According to this embodiment, an optional control circuit 374 and "AND" gates 376, 378, 380 generate the simulated electrode signals in synchronization with coil sequencer signals CL and CH. The control circuit 374 and the AND gates 376, 378, 380 can be a separate circuit as illustrated, or can alternatively be realized as part of the embedded processor 336.

The operation of the flow sensing circuit 328 in FIG. 3 is described in more detail below in an example flow chart in FIG. 4. The timing of signals in FIG. 3 is described in more detail below by way of example timing diagrams illustrated in FIGS. 5,6.

Figure 4:
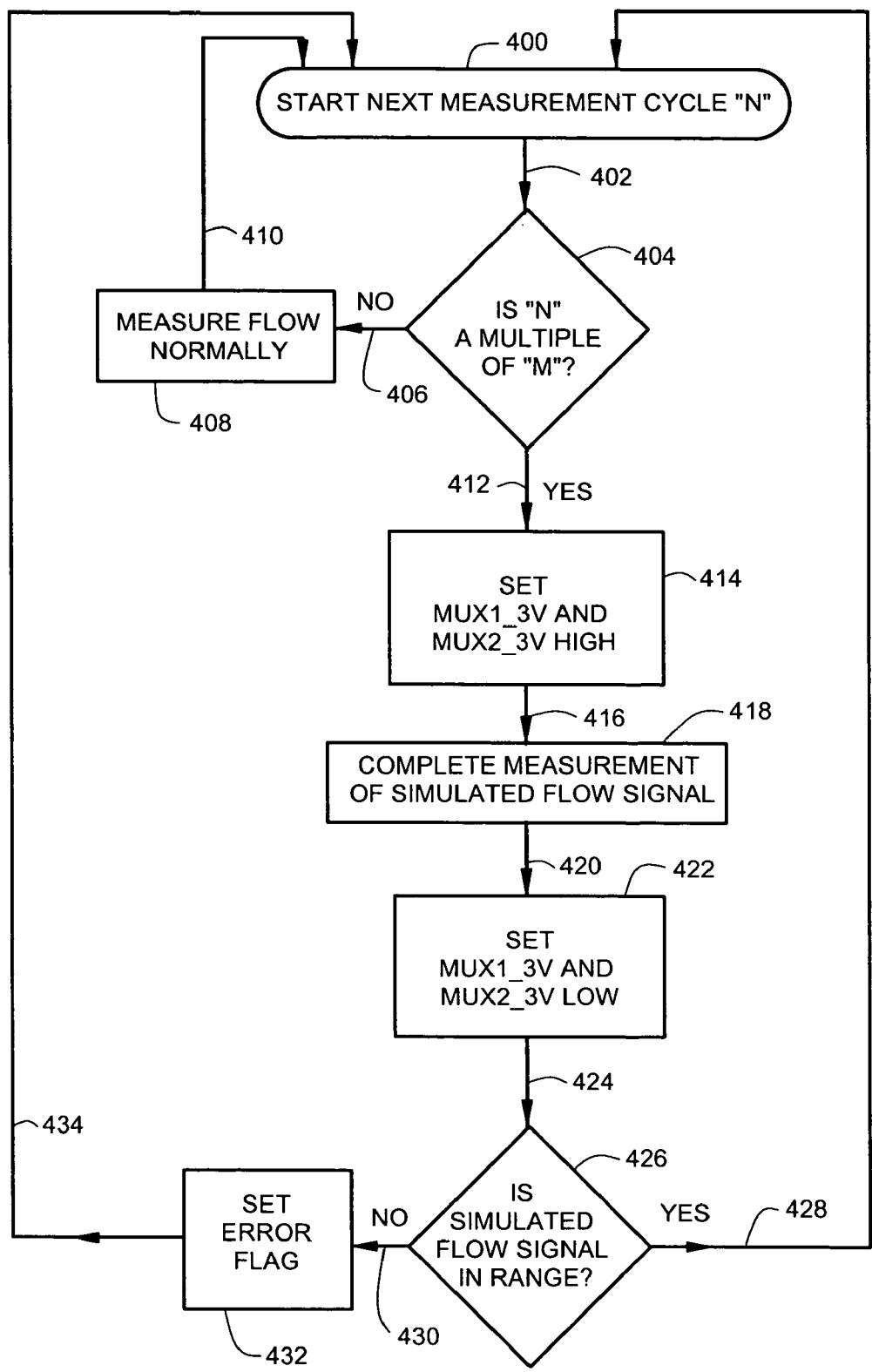
FIG. 4 illustrates an exemplary flow chart of a process of providing a simulated flow signal for testing a magnetic flow transmitter.

FIG. 4 illustrates an exemplary flow chart of a process of providing a simulated flow signal for testing a magnetic flow transmitter. The process begins at start 400 at the beginning of a measurement cycle numbered "N". A measurement cycle is a time interval during which a current (such as current 110 in FIG. 1) completes a full cycle of positive and negative polarity current, and a processor (such as processor 336 in FIG. 3) has taken a stream of multiple samples from an ADC output (such as ADC output 337 in FIG. 3) and has calculated a flow measurement or has calculated a simulated flow level. A measurement cycle typically lasts on the order of 0.1 second.

The process continues from START 400 along line 402 to decision block 404. At decision block 404, the integer number "N" of the current measurement cycle is compared to a simulation spacing integer number "M". The simulation spacing number "M" is typically in the range of 10–10,000. The simulation spacing number specifies how often a measurement cycle will be used for a simulation test rather than a flow measurement. For example, if M=10, then a simulation test (rather than an actual flow measurement) will be performed every tenth measurement cycle, e.g. at N=10, 20, 30, 40, 50, etc.

If the current number "N" is not a multiple of "M", then the process continues along line 406 to action block 408. At action block 408, a normal flow measurement is performed, and then the process continues along line 410 back to start 400 to start the next measurement cycle N=N+1.

If the current number "N" is a multiple of the "M", then the process continues along line 412 to action block 414. At action block 414, logic lines MUX1_3V and MUX2_3V (FIG. 3) are set high, thereby enabling sequencing signals CL and CH (control circuit 374 in FIG. 3) to pass through the AND gates 376, 380 (FIG. 3) to form the simulated signals SIM1, SIM2 (324, 326 in FIG. 3). After completion of action block 414, the process proceeds along line 416 to action block 418.

At action block 418, the flow sensing circuit (328 in FIG. 3) completes a measurement of the simulated flow signal as it appears at amplifier outputs 332, 334 in FIG. 3. After completion of action block 418, the process continues along line 420 to action block 422. At action block 422, MUX1_3V and MUX2_3V are both set low. After completion of action block 422, the process continues along line 424 to decision block 426.

At decision block 426, the simulated flow signal is compared to a normal range for the simulated flow signal. In a preferred arrangement, the simulated flow signal is superimposed on the normal flow signal as explained in more detail below in connection with a timing diagram in FIG. 6. As an alternative, however, switches can be used to disconnect or shunt the actual flow signal so that only the simulation signal reaches the amplifiers during a diagnostic test interval.

If the simulated flow signal is in the normal range, then the process continues along line 428 back to start 400 to begin the next measurement cycle. If the simulated flow signal is not in the normal range, then the process continues along line 430 to action block 432.

At action block 432, an error flag is set. The error flag provides the error indication 330 in FIG. 3. An error indication 330 provides a positive indication to service personnel that there is a malfunction in active circuitry in the transmitter 300. On the other hand, if there is no error indication, this provides an indication to service personnel that any observed flow measurement malfunction is likely to be found in the flowtube 100 (FIG. 1) or cable assembly 140 rather than the transmitter 300.

After completion of action block 432, the process continues along line 434 back to the start 400.

Figure 5:
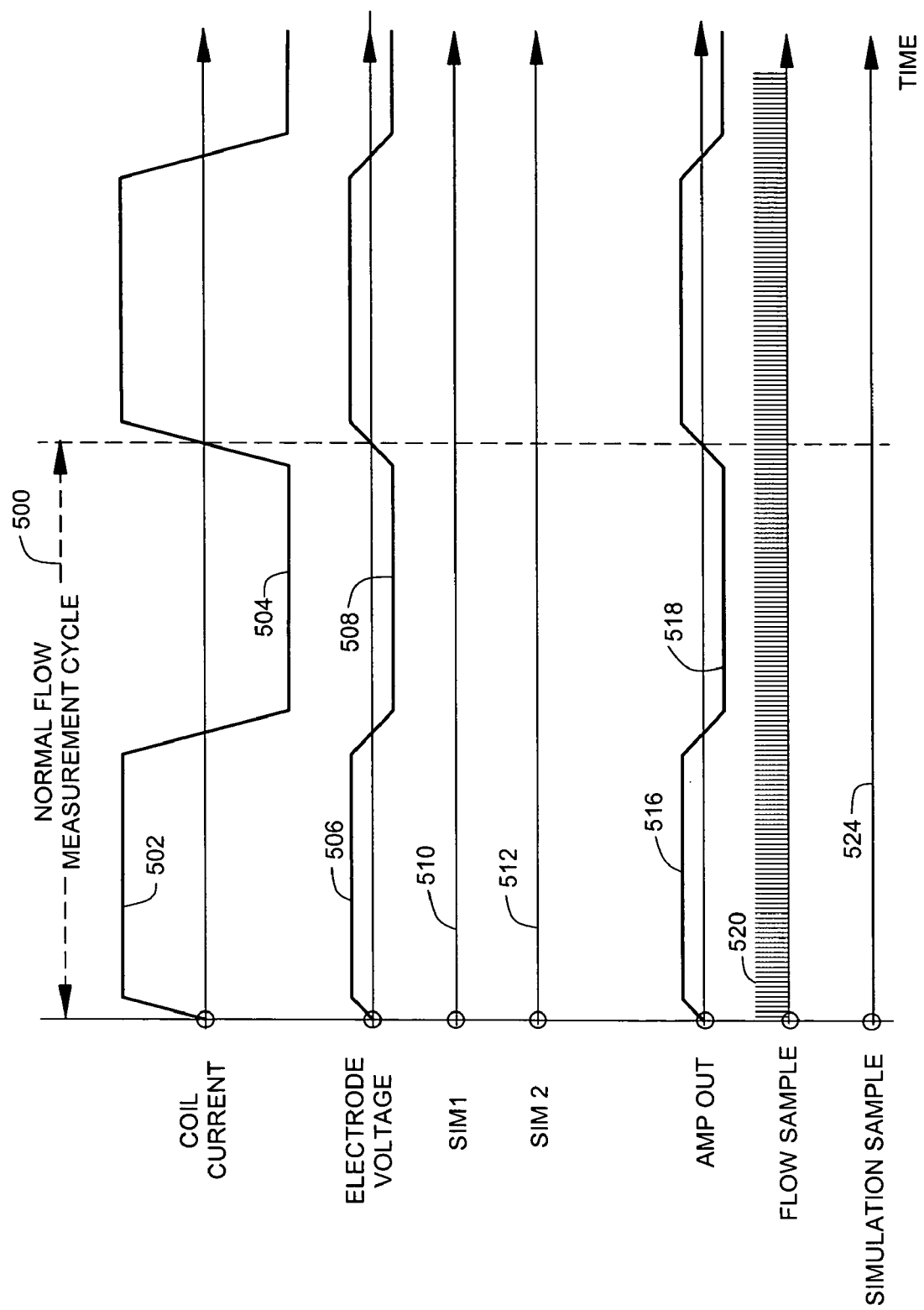
FIG. 5 illustrates a timing diagram of a normal flow measurement cycle during which a flow measurement is made.

FIG. 5 illustrates a timing diagram of a normal flow measurement cycle 500 during which a flow measurement is made, and during which there is no simulation signal present. In FIG. 5, the horizontal axes represent time and the vertical axes represent amplitude of signals in a magnetic flow transmitter such as the one illustrated in FIG. 3.

During the measurement cycle 500, the coil current goes through a single cycle of positive polarity current 502 and negative polarity current 504. The current induces a magnetic field that, in turn, induces a voltage at the electrodes that is proportional to flow and that also goes through a single cycle of positive polarity voltage 506 and negative polarity voltage 508. The amplitude of a difference between voltage levels 506 and 508 is proportional to liquid flow velocity.

Since this is a measurement cycle for actual flow measurement, the simulation signals SIM1, SIM2 remain at DC common at 510, 512. The simulation circuitry is essentially inactive.

The differential voltage at the amplifier outputs also goes though a single cycle of positive polarity voltage at 516 and negative polarity voltage at 518. The ADC 335 converts the amplifier voltage to a stream of digital samples that are coupled to the embedded processor. The embedded processor (336 in FIG. 3) processes the stream of samples as flow information samples 520. The samples 520 are added to a calculation of a flow indicating output (338 in FIG. 3). As indicated at 524, no samples are processed as simulation samples during the normal flow measurement interval 500.

Figure 6:
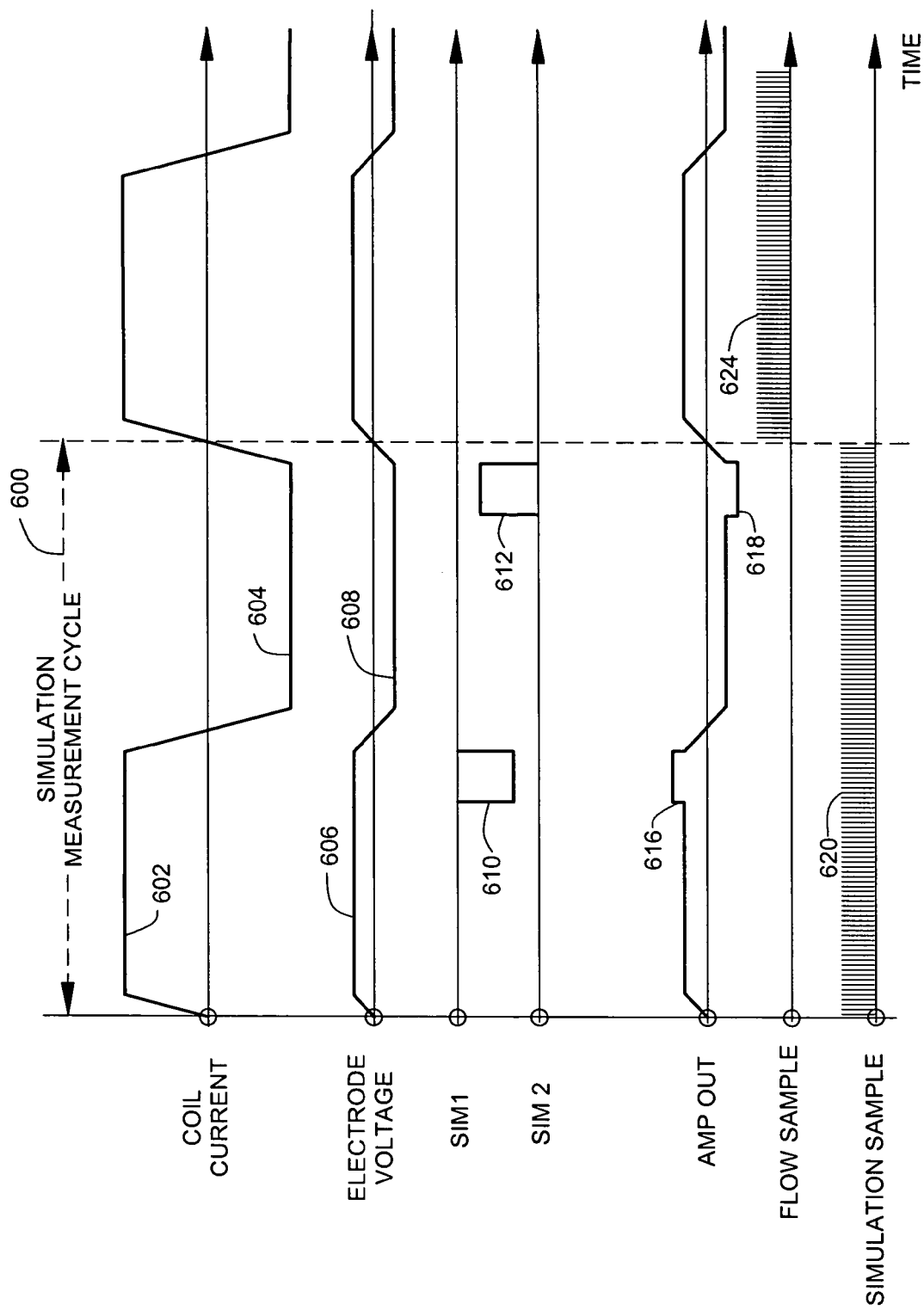
FIG. 6 illustrates a timing diagram of a simulation measurement cycle during which a simulation measurement is made.

FIG. 6 illustrates an example timing diagram of a simulation measurement cycle 600 during which a simulation measurement is made. The simulation measurement cycle is followed in time by a normal flow measurement cycle which is partly shown in FIG. 6. In FIG. 6, the horizontal axes represent time and the vertical axes represent amplitude of signals in a magnetic flow transmitter such as the one illustrated in FIG. 3. FIG. 5 is comparable to action block 408 in FIG. 4, while FIG. 6 is comparable to action blocks 414, 418, 422 of FIG. 4.

During the simulation measurement cycle 600, the coil current goes through a single cycle of positive polarity current 602 and negative polarity current 604. The current induces a magnetic field that, in turn, induces a voltage at the electrodes that is proportional to flow and that also goes through a single cycle of positive polarity voltage 606 and negative polarity voltage 608. Since this a simulation cycle for testing the transmitter active electronics, the simulation signal SIM1 provides a simulated flow pulse 610, and the simulation signal SIM2 provides a simulated flow pulse 612. The polarity of the simulated pulses (as they appear at the amplifier outputs) are the same polarity as the actual flow voltage. The actual electrode voltage and the simulated voltages are additive at the amplifier outputs and at the output of the ADC. The simulation circuitry is active, and the flow signal generation is active at the same time as the simulation is active.

The differential voltage at the amplifier outputs also goes though a single cycle of positive and negative polarity voltage pulses, with simulation pulses 616, 618 superimposed or added to the flow voltage pulses. The processor (336 in FIG. 3) processes a stream of samples 620 during the simulation interval as simulation samples (for updating the error output). After the simulation time interval is complete, the processor returns to processing a stream of samples 624 as normal flow measurements (for updating the flow indicating output).

During the simulation interval, the samples 620 are processed and the processed result is compared to a normal range, and an error flag is set if the simulated flow voltage in not in a normal range. As indicated at 624.

While the embodiments shown provide for additive arrangement of the simulation signal and flow signal, it will be understood by those skilled in the art that, as an alternative, switching can be provided (in FIG. 3) to shut off the actual flow signal during the simulation time interval 600. The differential amplifier provides an additive output in this alternative arrangement, however, the actual flow signal is reduced to a zero level by the switching during the simulation time interval.

It will also be understood by those skilled in the art that a flow sensing circuit (such as flow sensing circuits 228, 328) can be alternatively programmed to update both an error indication (such as error indications 230, 330) and a flow indicating output (such as flow indicating outputs 238, 338) during a diagnostic test interval.

Although the present invention has been described with reference to preferred embodiments, workers skilled in the art will recognize that changes may be made in form and detail without departing from the spirit and scope of the invention.

What is claimed is:

1. A magnetic flowmeter transmitter, comprising:
    a differential amplifier sensing an additive combination of actual flowmeter electrode outputs and simulated electrode outputs, the differential amplifier providing an additive amplifier output; and
    a simulator that provides the simulated electrode outputs, the simulator sensing the additive amplifier output and providing an error indication when the additive amplifier output is outside a normal range.

2. The magnetic flowmeter transmitter of claim 1 wherein the differential amplifier comprises:
    a first amplifier having a first input coupling to a first flowtube electrode contact and having a second input coupling to a first simulated electrode output; and
    a second amplifier having a third input coupling to a second flowtube electrode contact and a fourth input coupling to a second simulated electrode output.

3. The magnetic flowmeter transmitter of claim 2 wherein the simulator comprises:
    resistors coupling the first and second simulated outputs to the second and fourth inputs.

4. The magnetic flowmeter transmitter of claim 3 further comprising:
    feedback networks coupled to the first and second amplifiers, the resistors and feedback networks forming resistive voltage dividers that reduce the simulated outputs at the second and fourth inputs.

5. The magnetic flowmeter transmitter of claim 2 wherein the flow sensing circuit tests active electronics in the magnetic flowmeter transmitter.

6. The magnetic flowmeter transmitter of claim 2 wherein the simulator further comprises AND gates that generate the simulated electrode outputs.

7. the magnetic flow transmitter of claim 2 wherein the simulator receives samples of the outputs of the first and second amplifiers for sensing the response.

8. The magnetic flowmeter transmitter of claim 1 wherein the simulator comprises:
a flow sensing circuit that senses a response to the simulated outputs and provides the error indication.

9. The magnetic flowmeter transmitter of claim 8 wherein the flow sensing circuit compares the response to a normal range and provides the error indication when the response is outside the normal range.

10. The magnetic flowmeter transmitter of claim 1 wherein the simulator provides the simulated electrode outputs automatically.

11. The magnetic flowmeter transmitter of claim 1 wherein the simulator provides the simulated electrode outputs in response to a user request.

12. The magnetic flowmeter transmitter of claim 1 further comprising an analog-to-digital converter receiving the additive amplifier output and providing a stream of digital representations of the additive amplifier output to the simulator.

13. The magnetic flow transmitter of claim 1 wherein the flow transmitter comprises measurement cycles and the simulated electrode outputs are generated every M measurement cycles where M is an integer.

14. A method of testing a magnetic flowmeter transmitter, comprising:
providing simulated electrode outputs;
providing a differential amplifier sensing an additive combination of actual flowmeter electrode outputs and the simulated electrode outputs;
providing an additive amplifier output from the differential amplifier; and
sensing the additive amplifier output; and
providing an error indication when the additive amplifier output is outside a normal range.

15. The method of claim 14 further comprising:
coupling resistors from the simulated outputs to the differential amplifier.

16. The method of claim 15 further comprising:
providing feedback networks in the differential amplifier, the resistors and feedback networks forming resistive voltage dividers to reduce the simulated outputs as sensed by the differential amplifier.

17. The method of claim 14 further comprising:
sensing the additive amplifier output with an analog-to-digital converter and a flow sensing circuit.

18. The method of claim 17 further comprising:
comparing a digitized representation of the additive amplifier output to a normal range and providing the error indication when the response is outside the normal range.

19. The method of claim 14 further comprising:
providing the simulated electrode outputs automatically.

20. The method of claim 14 further comprising:
providing the simulated electrode outputs in response to a user request.

21. The method of claim 14 further comprising:
testing active electronics in the magnetic flowmeter transmitter with the simulated electrode outputs.

22. A magnetic flowmeter transmitter, comprising:
a first amplifier having first and second inputs, the first input coupling to a first flowtube electrode contact;
a second amplifier having third and fourth inputs, the third input coupling to a second flowtube electrode contact; and
a simulator that provides simulated electrode outputs to the second and fourth inputs, the simulator sensing a response to the simulated electrode outputs and providing an error indication when the sensed response is outside a normal range.

23. The magnetic flowmeter transmitter of claim 22 wherein the simulator comprises:
resistors coupling the simulated outputs to the second and fourth inputs.

* * * * *